United States Patent [19]

Lee et al.

[11] 4,402,221

[45] Sep. 6, 1983

[54] ACOUSTIC SUSPENSION SYSTEM

[75] Inventors: Mark C. Lee, La Canada; Taylor G. Wang, Glendale, both of Calif.

[73] Assignee: The United States of America as represented by the Administrator of the National Aeronautics and Space Administration, Washington, D.C.

[21] Appl. No.: 272,837

[22] Filed: Jun. 12, 1981

[51] Int. Cl.³ ............................................. F16C 32/00
[52] U.S. Cl. ........................................ 73/505; 308/10
[58] Field of Search .............. 73/505; 308/10; 269/20

[56] References Cited

U.S. PATENT DOCUMENTS

| | | | |
|---|---|---|---|
| 3,402,598 | 9/1968 | Colgate | 73/642 X |
| 3,560,913 | 2/1971 | Copley | 73/642 X |
| 3,616,697 | 11/1971 | Ensley | 73/505 |
| 4,218,921 | 8/1980 | Oran et al. | 73/505 |

*Primary Examiner*—James J. Gill

*Attorney, Agent, or Firm*—Paul F. McCaul; John R. Manning; Thomas H. Jones

[57] ABSTRACT

An acoustic levitation system is described, which can utilize a single acoustic source (12) and a small reflector (14) to stably levitate a small object (16) while the object is processed as by coating or heating it. The system includes a concave acoustic source (12) which has locations on opposite sides of its axis that vibrate towards and away from a focal point (36, FIG. 2) to generate a converging acoustic field. A small reflector (14) is located near the focal point, and preferably slightly beyond it, to create an intense acoustic field that stably supports a small object near the reflector. The reflector can be located about one-half wavelength (L, FIG. 3) from the focal point and can be concavely curved to a radius of curvature (L) of about one-half the wavelength, to stably support an object one-quarter wavelength (N) from the reflector.

14 Claims, 5 Drawing Figures

ACOUSTIC SUSPENSION SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Various techniques have been utilized to acoustically levitate objects. For example, U.S. Pat. No. 3,882,732 by Wang et al. describes acoustic levitation within a substantially closed chamber by the use of three standing wave patterns, and an object is held at the nodes of the three standing wave patterns. U.S. Pat. No. 4,218,921 by Oran et al. describes an acoustic levitation system wherein a linear transducer with a concave face, generates a largely collimated or planar acoustic wave field, which is reflected from an opposite reflector and shaped by a ring that surrounds the field, to support an object halfway between the transducer and reflector. While these systems can levitate objects of a variety of sizes compared to the size of the chamber or transducer, some movement of the object will occur. Where very small objects such as of the submillimeter size are to be levitated, and where it is desirable to prevent wandering of the object by more than its diameter, or even a large fraction of its diameter, it is difficult to achieve this with such prior art systems. A levitation system of moderate simplicity which could stably levitate small objects while preventing their movement by more than a small amount, would be of considerable benefit in the contactless processing of small objects.

SUMMARY OF THE INVENTION

In accordance with one embodiment of the present invention, an acoustic levitation system is provided, which can stably levitate a small object. The system includes an acoustic source for directing acoustic energy generally toward a focus, with the source having portions on either side of its axis which vibrate along local axes which are not parallel to each other, but which are instead directed substantially at the focus. An acoustic reflector positioned near the focus, reflects sound to create an intense local field near the reflector which stably supports a small object.

The acoustic source can include a curved plate and a plurality of transducers in intimate facewise contact with a surface of the plate and located on opposite sides of the axis of the curved plate. Each transducer vibrates the plate in a direction toward and away from the focus to assure the generation of a converging acoustic wave pattern. The reflector is positioned much closer to the focus than the acoustic source, and can be concavely curved to a much smaller radius of curvature than the source to produce an intense localized acoustic field. With the reflector located about one-half wavelength beyond the focus, a small object is stably supported one-quarter wavelength from the reflector.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
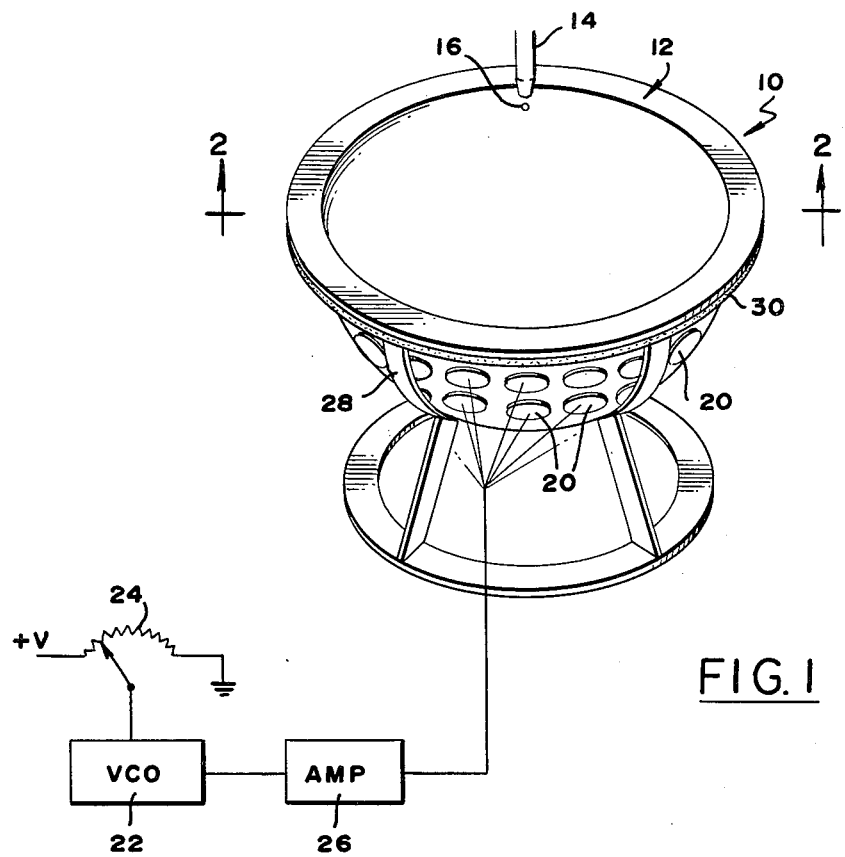
FIG. 1 is a perspective view of a levitation apparatus constructed in accordance with the present invention.
Figure 2:
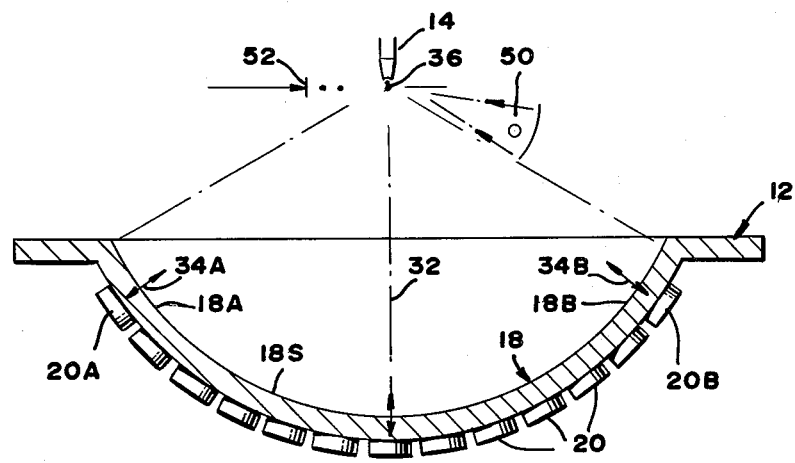
FIG. 2 is a sectional view taken on the line 2—2 of FIG. 1.
Figure 3:
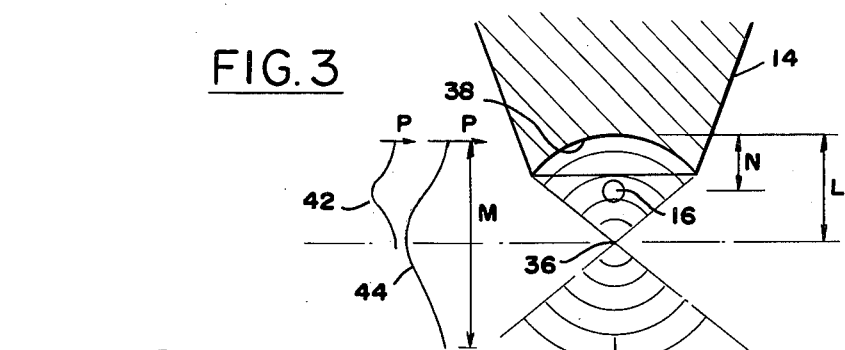
FIG. 3 is an enlarged sectional view of a portion of the apparatus of FIG. 2, and also including graphs showing variations in static and acoustic pressures.

FIG. 1 illustrates an acoustic levitation system 10 which includes an acoustic source 12 and a reflector 14 which supports a small object 16 between them. As also shown in FIGS. 2 and 3, the acoustic source 12 includes a curved plate 18, which is concavely curved in three dimensions in a dish shape, and a group of transducers 20 attached to a surface of the plate. The transducers are driven in synchronism by a voltage controlled oscillator 22 (FIG. 1) whose frequency is controlled by the output of a voltage source 24, and whose output is delivered through an amplifier 26 to the transducers. The acoustic source is shown supported on a stand 28 which includes a cushion layer 30 that supports the rim of the dish 12.

The use of numerous transducers 20 which are attached to a face of the plate, causes each plate portion to vibrate perpendicular to its face. Thus, a pair of transducers 20A and 20B (FIG. 2) which lie on opposite sides of the axis 32 of the dish, vibrate the corresponding dish portions 18A and 18B along local axes 34A and 34B that are not parallel. Instead, the axes of vibration 34A, 34B coverge on a focus or focal point 36 of the system. The reflector 14 is preferably located a short distance beyond the focus 36.

In order to support a small object, the acoustic source 12 is driven at a high frequency which results in a sound wavelength which is a small fraction of the distance along the axis 32 from the focus 36 to the surface 18s of the dish. For example, a dish 18 of a diameter of 12 inches (300 mm) may be driven at a frequency such as 100 kHz which produces a wavelength in air of about 3.5 mm. As shown in FIG. 3, the reflector 14 is positioned with its surface 38 a relatively small distance L from the focus 36, which is preferably about one-half the wavelength M of the sound waves. The object 16 is stably held at a position along the axis 32 which is spaced a distance N of one-quarter the wavelength of the sound. An object 16 of a small size such as one-tenth the wavelength M of the sound, can be stably held in position.

It has been found that the most stable levitation of an object is achieved by concavely curving the surface 38 of the reflector to a small radius of curvature which is much smaller than that of the source at its plate surface 18s. The curvature of the reflector surface 38 is preferably to a radius of curvature equal to about one-half the wavelength of the acoustic waves, or in other words, with a curvature which is roughly centered on the focus 36. As a result, when the reflector is spaced one-half wavelength from the focus, the reflector reflects sound waves passing through the focus, in a direction perpendicular to the reflector surface to tend to return the waves through the focus 36. Although objects have been supported by reflectors with a larger radius of curvature or even of flat or convex configuration, it is found that the small concave radius of curvature of much less than that of the acoustic source plate provides the strongest field for stably supporting an object utilizing acoustic waves of only moderately strong intensity. A reflector diameter of about ⅔ rd wavelength is used. A considerably wider reflector reduces lateral stability of the sample, because it broadens the minimum pressure well, while a much smaller reflector reflects only a small portion of the sound power.

The system of FIGS. 1–3 has been found to stably support objects 16 such as spheres, of a diameter of between about one-third to one-hundredth the wavelength M of the sound, with the greatest stability being achieved for objects of about one-tenth the wavelength. Such objects have been found to wander laterally by no more than about 10% of their diameter, and to resist any substantial vertical wandering. It is found that the object 16 remains stably in position at a distance N of about one-quarter wavelength from the reflector surface 38 despite small excursions of the reflector of up to about one-eighth wavelength from its illustrated position. In a zero gravity environment the distance N is one-quarter wavelength, but under gravity there is slight sagging dependent upon the specific gravity of the object and the intensity of the field. When the size of the object becomes very small, such as less than about one-hundredth wavelength, streaming forces produce instability that can permit the sample to move sidewardly out of the field. Such smaller samples can be levitated by the use of higher frequencies. Sound intensities of about 155 dB (decibels) have been required to levitate water at 100 kHz, while an intensity of about 167 dB is required to levitate mercury. Objects of a density of up to 19.3 (i.e. of gold) have been levitated. It may be noted that the acoustic levitation force increases proportionately with frequency, for a source driven at a constant voltage input.

Figure 4:
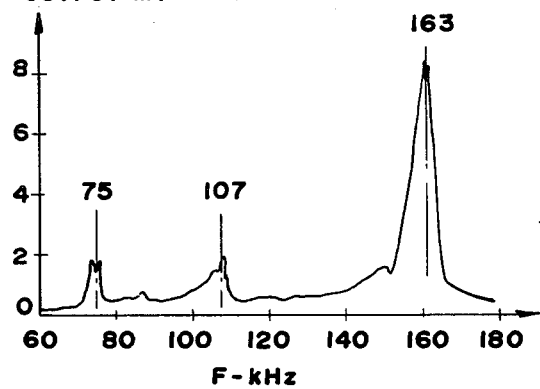
FIG. 4 is a graph showing variations in the output of the acoustic source of FIG. 1 with frequency.

FIG. 4 shows the resonant characteristics of the acoustic source 12. The source 12 included an aluminum dish with an upper face diameter of about twelve inches and curved to a radius of about 6 inches. The plate 18 had a thickness of 0.6 inches (about 15 mm). One hundred thirty piezoelectric transducers 20 of a diameter of one inch and a thickness of 0.4 inch (about 10 mm) were bonded to the lower face of the dish, or in other words to the surface opposite the focus. The upper and lower faces of the transducers were respectively concavely and convexly curved to match the dish. As shown in FIG. 4, the source had several resonant frequencies, including 75 kHz, 107 kHz, and 163 kHz. At frequencies 20% less or more than each resonant frequency, the output of the source is less than one-half that at the resonant frequency. The measurements were made by placing a microphone at the focus of the source and measuring the output of the microphone as the source was driven at various frequencies but at the same voltage level. The height of the graph is the output of the microphone in millivolts.

In order to determine the best position of the reflector 14, a microphone with a narrow sensing tube of about 1 mm diameter was introduced at a slight angle into the force field created by the source. The focus of the source is known, and the tube end was positioned slightly beyond the focus and moved away from it to find the first axial location of highest acoustic pressure beyond the focus. The reflector was then placed with its center at that location.

The acoustic levitation of a small object is useful in performing processes on it. For example, in the creation of a fusion target which includes a coated hollow sphere of glass or plastic which encloses deuterium and trittium gases, the centering of the bubble within the spherical outer surface of the sphere, can be accomplished by suspending and vibrating the sphere while it is in a molten plate. An infrared or other heat source 50 (FIG. 2) can be utilized to heat the target while it is acoustically suspended. The target can be vibrated by modulating the output of the driver 22, as at a lower frequency of one kHz, to vibrate the sphere. In another operation on a fusion target, wherein it is to be coated with a metal, this can be accomplished while it is acoustically suspended, by deploying small particles of metal into the acoustic walls, as by releasing the particles from a vacuum chuck. The acoustic forces cause the metal particles to contact the sphere. The metal then can be melted by a heat source to cover the sphere. The sample tends to rotate because of acoustic streaming, so that heat and/or a coating tends to be distributed on the sample surface. Such rotation can evenly distribute a coating from an atomizer or from a vapor deposition source 52.

Figure 5:
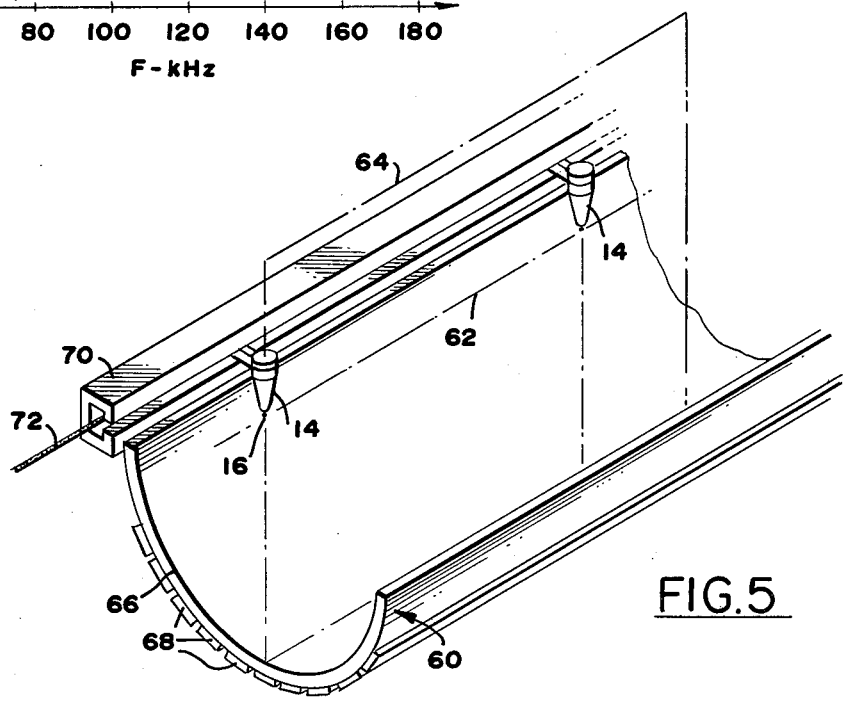
FIG. 5 is a partial perspective view of an acoustic levitation apparatus constructed in accordance with another embodiment of the invention, which utilizes a trough-shaped acoustic source.

FIG. 5 illustrates another acoustic levitation system which permits the controlled movement of objects 16 without contact with a solid. This is accomplished by the use of a trough-shaped acoustic source 60 which produces acoustic energy that converges towards a focus extending along a line 62. That is, when the source 60 is viewed in a cross section taken perpendicular to its length, it appears to have an axis lying on a central plane 64 of the trough on which the focus 62 lies. The source includes a trough-shaped plate 66 and a plurality of transducers 68 attached to the convex side of the plate. The transducers 68 can be in the form of multiple discs bonded to the lower side of the plate, or may each have a strip-like shape. Each of the reflectors 14 has the same form as is shown in FIG. 3, with a small diameter at its reflector surface which is much less than one-tenth the length of the trough. Thus, although most of the volume of the acoustic field does not converge along the length of the trough, each of the reflectors 14 produces a convergent field near itself because of its concave reflective surface.

The resultant converging field near each of the reflectors 14, where the suspended object is located, enables stable levitation of the object. Thus, the object can be held slightly below the reflective surface of each of the reflectors 14, despite movement of the reflectors parallel to the track 70. A cable 72 which is pulled, can be utilized to move the reflectors, to thereby move each of the suspended objects along a predetermined path. Various processing facilities such as heating sources, vapor deposition or spray coating sources, and the like can be located along the path of the objects.

It may be noted that in the moving of objects, it is not necessary to utilize a trough-shaped acoustic source. Instead, it is possible to utilize a trough-shaped reflector cylindrically curved to the same small radius of curvature as in FIG. 3, together with multiple dish-like sound sources of the type shown in FIG. 1 which can be moved to thereby move the object. However, such a system would be considerably more complex than that shown in FIG. 5.

Thus, the invention provides a system for the contactless support of an object, which enables the stable positioning of small objects, utilizing an acoustic source of only moderate complexity and which leaves considerable area around the supported object for access to the object by processing apparatus. This is accomplished by utilizing an acoustic source which produces a convergent acoustic field at least as seen in one cross sectional view of the source. A reflector positioned near the focus of the convergent sound waves, creates a localized field near the reflector which enables the stable positioning of a small object. The acoustic source is constructed so that portions of the source on opposite sides of a centerline or axis of the source which passes through the focus, vibrate along local axes of vibration which are not parallel to one another, but which instead converge substantially towards said focus. The reflector can be formed to a small radius of curvature which is much less than that of the source, and can be positioned about one-half wavelength from the focus, to stably support an object about one-quarter wavelength from the reflector.

Although particular embodiments of the invention have been described and illustrated herein, it is recognized that the modifications and variations may readily occur to those skilled in the art and consequently, it is intended that the claims be interpreted to cover such modifications and equivalents.

What is claimed is:

1. An acoustic levitation apparatus, comprising:
   an acoustic source having a major axis, as seen in a cross-sectional view, for directing acoustic energy from locations on opposite sides of the major axis substantially toward a focus, said source having source portions on either side of said axis which are constructed to vibrate along local axes which are not parallel to each other but which are instead directed substantially at said focus;
   an acoustic reflector having a reflecting surface facing said source, said reflecting surface positioned near said focus, at a distance therefrom which is less than half the distance of the source from the focus, to reflect sound in a direction substantially toward said source; and
   a quantity of fluid between said source and reflector.

2. The apparatus described in claim 1 wherein:
   said reflector is positioned beyond said focus, so it lies further from said source than does said focus, said reflector being spaced beyond said focus by less than the distance of said source from said focus, and said reflector is concavely curved to a smaller average radius of curvature than said distance of said source from said focus.

3. The apparatus described in claim 1 wherein:
   said acoustic source is driven at a predetermined frequency, said reflector is concavely curved to a radius of about one-half wavelength, and said reflector is spaced about one-half wavelength beyond said focus.

4. The apparatus described in claim 1 wherein:
   said acoustic source includes means for driving said source portions at a predetermined frequency; and
   said reflector is positioned on the order of one-half wavelength from said focus, and said source is spaced a plurality of times further from said focus than is said reflector.

5. The apparatus described in claim 1 wherein:
   said acoustic source includes means for driving said source portions at a predetermined frequency;
   said source is located more than ten wavelengths from said focus; and including
   an object located one-quarter wavelength in front of said reflector.

6. An acoustic apparatus for use in a fluid medium, comprising:
   a sound generator positioned to direct sound in a predetermined general direction;
   said sound generator including a curved plate-like member having a concave face, and a plurality of transducers intimately attached to a face of said plate-like member at laterally spaced locations thereon so that vibrations of said spaced locations normal to the face of the concave member at each location, generates a converging sound wave pattern, with the areas of said member faces that are not covered by said transducers as well as the faces of the transducers lying opposite the member, being free of covering for contact with said fluid medium.

7. The levitation apparatus described in claim 6 wherein:
   said plate-like member with said transducers thereon has at least one resonant frequency at which the measured sound intensity at a location in front of said member is at least twice as great as at frequencies 20% greater and lesser than said resonant frequency when the power into said transducers is the same at each frequency; and
   said sound generator includes means for energizing said transducers at said resonant frequency.

8. An acoustic levitation system, comprising:
   a wide concave acoustic transducer assembly which is energizable to direct acoustic energy from opposite sides of a centerline at a focus spaced a predetermined distance along said centerline from said assembly:
   a reflector spaced along said centerline to lie beyond said focus; and
   means for energizing said transducer assembly at a predetermined frequency;
   said reflector lying approximately one-half wavelength from said focus, and said transducer assembly lying a plurality of times further from said focus than does said reflector.

9. The system described in claim 8 wherein:
   said reflector is concavely curved to a radius of curvature less than one-half that of said concave transducer assembly.

10. An acoustic levitation system comprising:
    means for generating a converging acoustic field of predetermined wave length; and
    a reflector having a surface that faces said generating means and that is located about one-half wavelength beyond the location of convergence of said field.

11. The system described in claim 10 including:
    an object located one-quarter wavelength from said reflector, and having a width of between one-third and one-hundredth wavelength.

12. A method for acoustically suspending an object, comprising:
    vibrating a plurality of transducer portions lying on opposite sides of a predetermined centerline, toward and away from a focus located along said centerline, to direct acoustic waves substantially at said focus; and reflecting said acoustic waves from a location beyond said focus, in a direction generally back through said focus, whereby to hold an object stably near said reflector.

13. The method described in claim 12 including:

energizing said transducers at a predetermined frequency; and supporting an object at a distance from said reflector approximately equal to a quarter wavelength of the acoustic waves generated by said transducer portions.

14. An acoustic levitation apparatus, comprising:

an acoustic source having a major axis, as seen in a cross-sectional view, for directing acoustic energy from locations on opposite sides of the major axis substantially toward a focus, said source having source portions on either side of said axis which are constructed to vibrate along local axes which are not parallel to each other but which are instead directed substantially at said focus;

an acoustic reflector positioned near said focus to reflect sound in a direction substantially toward said source;

said acoustic source being trough shaped, said reflector having a reflective surface of limited length in a direction parallel to said trough which is less than one-tenth the length of the trough; and means for guiding said reflector in movement parallel to said trough.

* * * * *